United States Patent [19]
Belli et al.

[11] Patent Number: 5,581,044
[45] Date of Patent: Dec. 3, 1996

[54] COATING EMPLOYED WITH LAMINATED HEAD OF PLASTIC SHEET MATERIAL AND A SYNTHETIC FABRIC MATERIAL

[75] Inventors: Remo D. Belli; Gerardo J. Reyes, both of North Hollywood, Calif.

[73] Assignee: Remo, Inc., N. Hollywood, Calif.

[21] Appl. No.: 342,151

[22] Filed: Nov. 18, 1994

[51] Int. Cl.$^6$ ................................................ G10D 13/02
[52] U.S. Cl. ................................. 84/414; 428/290
[58] Field of Search ........................ 84/414; 428/288, 428/289, 290

[56] References Cited

U.S. PATENT DOCUMENTS 4,308,782  1/1982  Hartry ........................................ 84/414
5,091,248  2/1992  Belli ........................................... 84/290
5,160,776  11/1992 Li et al. ..................................... 428/109

Primary Examiner—Patrick J. Stanzione
Attorney, Agent, or Firm—Rapkin, Gitlin & Moser

[57] ABSTRACT

A head for a drum or similar musical instrument including a synthetic plastic sheet material laminated to a synthetic fabric material having a plurality of layers of randomly orientated individual fibers. An epoxy resin is applied to the synthetic fabric material for coating and sealing the surface, impregnating the layers of fibers and encapsulating each of the individual fibers to preclude delamination of the fibers when the head is subjected to the constant pounding of a drumstick or sweeping motion of a drum brush upon its striking surface.

12 Claims, 1 Drawing Sheet

COATING EMPLOYED WITH LAMINATED HEAD OF PLASTIC SHEET MATERIAL AND A SYNTHETIC FABRIC MATERIAL

BACKGROUND OF THE INVENTION

1. Field of the Invention

The present invention relates generally to the area of drumhead construction and, more particularly, to a head for a drum that includes a synthetic plastic sheet material, a fabric material laminated thereto and an epoxy compound applied to seal and impregnate the fabric material and encapsulate the individual randomly orientated fibers therein to preclude delamination.

2. Description of the Prior Art

Drumheads of various types are well known in the prior art. Hartry, U.S. Pat. No. 4,308,782 contains an informative discussion in this area.

The objective of Hartry is to provide a laminated head comprised of bonded sheets of synthetic fabric and plastic materials. The plastic sheet material remains the primary tension load carrier while the fabric material acts to distribute the load. This combination reduces the tendency of the plastic sheet material to dent as well as dampen undesirable overtones, and provides an improved brush surface. The synthetic fabric material preferred by Hartry includes the category of spunbonded olefins, such as polyethylene. In the prior art, polyethylene fibers have usually been the material of choice for drumhead construction. The material is extremely versatile for use in a wide variety of applications and, due to its strength, light weight, smooth finish and close simulation to an actual animal skin, has been adapted for use in the manufacture of drumheads and similar products. However, polyethylene has a serious drawback in its tendency to delaminate when subjected to the constant pounding of a drumstick or the sweeping motion of a brush. Thus, for example, as the brush sweeps the surface of the head, the individual fiber components in the polyethylene tend to come apart and separate forming elevated hairlike filaments in which the wire or nylon bristles of the drum brush become entangled.

As a solution to this problem, Remo, U.S. Pat. No. 5,091,248, provides an improved drumhead construction involving a laminate of a synthetic fabric material comprised of polyester and a synthetic plastic sheet material bonded together. The drumhead is coated by a vinylidene chloride copolymer, which acts to seal the head surface and impregnate the fabric sufficiently to preclude delamination of the randomly orientated fibers in the polyester upper layer. Although one major problem appeared to be resolved with the substitution of the polyester fabric material in place of the polethylene and the use of the vinylidene chloride coating, other problems seemed to persist. With the exception of the delamination tendency, polyethylene is still generally recognized as a more durable material than polyester with a much greater life span. Polyethylene also has superior tonal and tactile characteristics compared to polyester providing a greater warmth of sound and a more authentic or natural animal skin appearance. The Remo drumhead with the polyester upper layer, and despite the improvement, is still subject to a certain degree of delamination when the head is exposed to rain as so often occurs when the head is used with a drum carried in a marching band. Thus, even the Remo device is not able to fully address and solve the problems in the prior art that continue to plague these drumheads.

The present invention solves the foregoing problems in the prior art by utilizing a combination of elements, including a laminate of a polyethylene fabric material and a synthetic plastic sheet material, and an epoxy resin coating. The epoxy seals the surface of the fabric material, acts to impregnate the layers of the randomly nonorientated fibers in the polyethylene and fully encapsulates each of the individual fibers eventually mixing with the adhesive contained between the sheet materials to enhance the strength of the bond between them. These combined elements, which were previously unknown and unexplored in the drumhead technology, when working in concert, succeed in improving both the integrity of the laminated drumhead, by precluding delamination under even the most adverse weather conditions, and the tonal, tactile and visual characteristics of the head.

SUMMARY OF THE INVENTION

The present invention provides for a head for a drum or similar musical instrument comprising a synthetic plastic sheet material laminated to a synthetic fabric material having a plurality of layers of randomly orientated individual fibers. An epoxy resin is applied to the synthetic fabric material for sealing the fabric, impregnating the layers of fibers therein and encapsulating each of the individual fibers to preclude delamination of the fibers when the head is subjected to the constant pounding of a drumstick or sweeping motion of a drum brush upon its striking surface.

The preferred combination of elements that constitute the present invention includes a fabric layer comprised essentially of a sheet of polyethylene material, which includes several layers of randomly orientated individual fibers, laminated to a synthetic plastic sheet material using any conventional adhesive, such as an elastomeric high density polyolefin, to bond the two together. Applied to the surface of the fabric layer is an epoxy resin, which impregnates the various layers of the nonorientated fibers, encapsulates each of the individual fibers and ultimately mixes with the adhesive to enhance the strength of the bond. When fully cured, the epoxy resin acts to seal the surface of the fabric material and the area immediately around each of the fibers making the drumhead substantially impervious to water and gas infiltration. The resin achieves this in large part by creating a bond among the various layers of fibers and encapsulating the individual fibers. The resin also mixes with the adhesive to enhance its bonding strength. The end result is to preclude delamination and to improve overall the tonal, tactile and visual characteristics of the head.

Accordingly, an object of the present invention is to provide a laminated head of a drum or similar musical instrument comprising a synthetic fabric material having several layers of nonorientated individual fibers and a synthetic plastic material that precludes delamination of the synthetic fabric material by application of a chemical compound that seals the fabric surface, impregnates the various layers of fibers and fully encapsulates the individual fibers therein.

Still another object of the present invention is to provide a laminated head of a drum or similar musical instrument that includes a chemical compound which coats and seals the drumhead surface and eventually penetrates the adhesive that bonds the lamination together to enhance the strength of the bond.

Still another object of the present invention is to provide a laminated head of a drum or similar musical instrument that precludes delamination of the nonorientated individual fibers in the synthetic fabric material.

Still another object of the present invention is to provide a laminated head of a drum or similar musical instrument which improves the tonal, tactile and visual qualities of the drumhead.

Still another object of the present invention is to provide a laminated head of a drum or similar musical instrument that is easily and efficiently manufactured.

Other objects and advantages of the present invention will become apparent in the following specifications when considered in light of the attached drawings wherein the preferred embodiment of the invention is illustrated.

DETAILED DESCRIPTION OF THE PREFERRED EMBODIMENT

Figure 1:
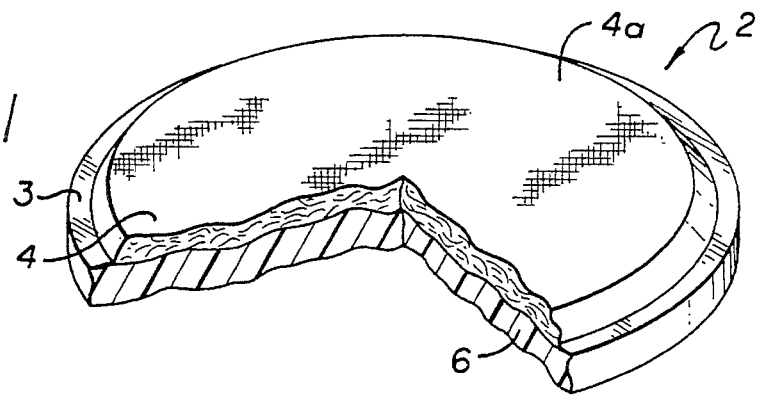
FIG. 1 is a perspective view of the present invention showing a laminated drumhead 2 having a top or synthetic fabric layer 4 impregnated with an epoxy resin 8, a bottom or synthetic plastic layer 6, all mounted on a hoop 3.
Figure 2:
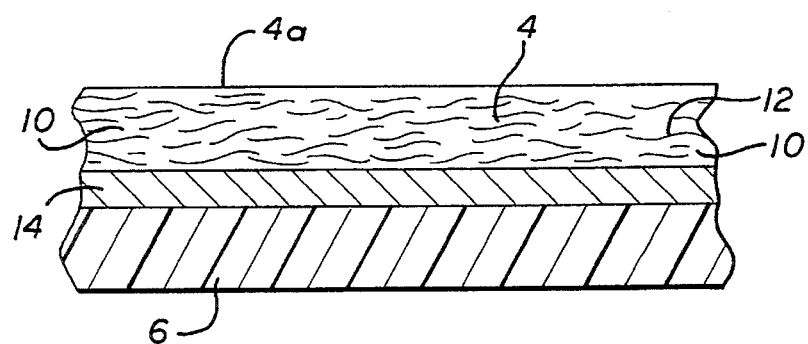
FIG. 2 is a cross-sectional view of the present invention showing the laminated layers of drumhead 2, including the top synthetic fabric layer 4, the bottom plastic layer 6, and the layers 10 of nonorientated fibers 12 that comprise the fabric layer 4. Adhesive layer 14 bonds the two principal layers together.
Figure 3:
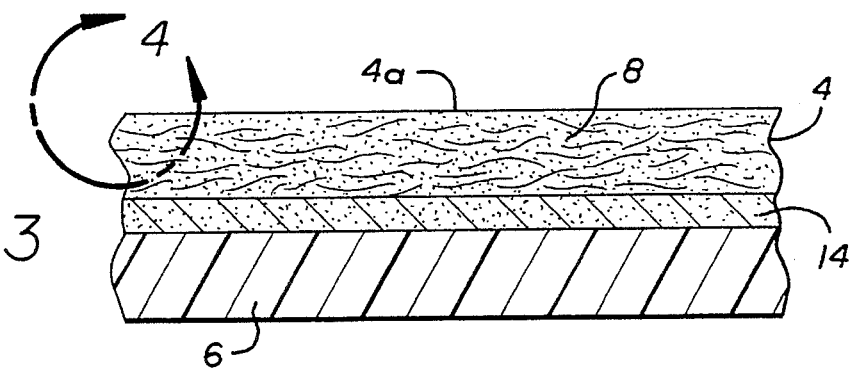
FIG. 3 is a cross-sectional view of the present invention showing the epoxy resin 8 impregnating the layers 10 of nonorientated fibers 12, encapsulating the individual fibers 12 and penetrating into the adhesive 14 to enhance the bond between the principal layers.
Figure 4:
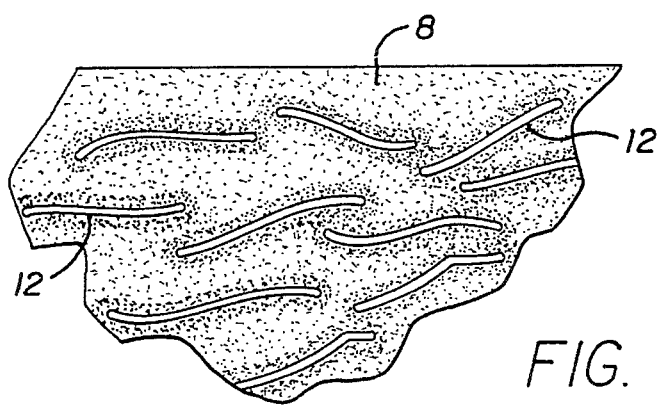
FIG. 4 is an enlarged detailed sectional view of the present invention taken along line 4 of FIG. 3.

Referring more particularly to the drawings, FIG. 1 is a perspective view of the present invention depicting a hoop 3 for mounting a laminated head 2 of a drum or similar musical instrument comprising a top synthetic fabric layer 4 made of polyethylene, a bottom plastic layer 6, an epoxy resin compound 8, which is applied to the surface 4a of the fabric layer 4. The epoxy resin 8 acts in several respects. It coats (and later seals) the surface 4a, continues into the fabric layer 4 to impregnate the layers 10 of the nonorientated fibers 12, and then encapsulates each of the nonorientated individual fibers 12. Eventually, epoxy resin 8 penetrates into the adhesive 14, which bonds the layers 4 and 6 together, to enhance the strength of that bond.

The fabric layer 4 contains filament polyethylene fibers 12 that are randomly arranged and highly dispersed. One such spunbonded olefin fabric is produced and sold under the trademark TYVEK®. TYVEK® provides a playing surface very similar to that of natural skins and contains many outstanding features, including high tensile strength, high elongation to break, excellent tear strength and a high resistance to water, gas and certain chemicals.

A preferred synthetic plastic sheet material is the biaxially orientated film of the condensation polymer of ethylene glycol and terephthalic acid, which is produced and sold under the trademark MYLAR®. MYLAR® is not susceptible to moisture and changes in the weather, and has good flexibility, durability and tensile strength. However, other synthetic plastic sheet materials may also be utilized in the practice of the present invention. As an alternative to the plastic, a polyester film may also be utilized in place of the plastic sheet material as the primary tension load carrier.

The epoxy resin 8 comprises a compound made from a conventional epoxy, such as Ciba-Geigy's GY95-13, an amine hardener and a solvent, such as N-methylpyrrolidone. The amine hardener is actually a blend of a cycloaliphatic amine and an aliphatic amine. The cycloaliphatic amine is provided for its ability to cure effectively under the most adverse conditions and to resist moisture. The aliphatic amine is provided to contribute color stability to the epoxy compound. The preferred blend for the amine hardener is 50/50, though variations, such as a 55/45 or a 60/40 blend, can be effective for the intended purpose. The preferred proportion of the solvent is 5%. Portions at 2½% and less do not allow for the effective penetration of the fabric by the epoxy. Portions increasingly above 5% gradually allow for the epoxy to become excessively wet, which will undermine the benefits otherwise derived from the compound.

In practice then, the epoxy resin 8 is formed by first combining the epoxy with the solvent and then adding the amine hardener. The preferred proportions are 2 parts epoxy solution to 1 part hardener. With the lamination of layers 4 and 6 already complete, the epoxy compound is then applied to the surface 4a of the fabric layer 4 using any conventional means for this purpose, such as a sponge, brush, roller or squeegee device. Upon application, the epoxy resin begins to penetrate the surface 4a into the layers 10 of the nonorientated polyethylene fibers 12 and encapsulate each of the individual fibers 12 in the process. The epoxy resin 8 continues to penetrate the fabric layer 4 and eventually impregnates the adhesive 14, which it mixes with to enhance the bond between the fabric layer 4 and the bottom plastic layer 6. The epoxy coated laminate is then cured overnight at room temperature or, if an accelerated curing is desired, the laminate is placed in an oven for an hour or two at 100°–150° F.

The present invention is a vast improvement over the prior art. The coated laminate, as described heretofore, not only provides a drumhead that better simulates the appearance of a natural skin than anything before it in the prior art, it also provides a product that has greater durability, given its resistance to the fraying of the fibers, an improved warmth of sound and a more authentic and natural feel.

While the invention will be described in connection with a certain preferred embodiment, it is to be understood that it is not intended to limit the invention to that particular embodiment. Rather, it is intended to cover all alternatives, modifications and equivalents as may be included within the spirit and scope of the invention as defined by the appended claims.

We claim:

1. A head for a drum or similar musical instrument comprising, a synthetic plastic sheet material laminated to a synthetic fabric material having a surface and a plurality of layers of randomly orientated individual fibers, and a means applied to said synthetic fabric material for impregnating said layers of randomly orientated individual fibers and encapsulating in a concentrated mass around each of said individual fibers to preclude delamination of said fibers when said head is subjected to the beating or pounding of a drum stick or the sweeping stroke of a drum brush upon its surface.

2. A head as in claim 1 wherein said means applied to said synthetic fabric material comprises an epoxy resin compound.

3. A head as in claim 2 wherein said epoxy resin compound comprises epoxy material in combination with an amine hardener and a solvent.

4. A head as in claim 3 wherein said amine hardener comprises a blend in equal proportions of an aliphatic amine and a cycloaliphatic amine.

5. A head as in claim 3 wherein said solvent comprises N-methylpyrrolidone.

6. A head as in claim 3 wherein the ratio of epoxy resin to solvent in the compound is approximately 20 to 1.

7. A head as in claim 1 wherein an adhesive means is introduced between said synthetic plastic sheet material and said synthetic fabric material to bond said materials together.

8. A head as in claim 7 wherein said adhesive means comprises an elastomeric high density polyolefin.

9. A head as in claim 7 wherein said means applied to said synthetic fabric material impregnates said adhesive means to enhance the strength of the bond between said fabric material and said plastic sheet material.

10. A head as in claim 1 wherein said means applied to said synthetic fabric material is adapted to seal and protect the surface of said fabric material from liquid and gas infiltration.

11. A head as in claim 1 wherein said synthetic fabric material is comprised of polyethylene.

12. A head as in claim 1 wherein said synthetic fabric material is comprised of a spunbonded olefin.

* * * * *